United States Patent [19]

Nishimura

[11] Patent Number: 5,050,444
[45] Date of Patent: Sep. 24, 1991

[54] BICYCLE BRAKE LEVER ASSEMBLY

[75] Inventor: Mitsuo Nishimura, Sakai, Japan

[73] Assignee: Maeda Industries, Ltd., Osaka, Japan

[21] Appl. No.: 560,841

[22] Filed: Jul. 31, 1990

[30] Foreign Application Priority Data

Aug. 28, 1989 [JP] Japan ............................ 1-100097[U]

[51] Int. Cl.⁵ .......................... F16C 1/10; G05G 11/00
[52] U.S. Cl. ...................................... 74/502.2; 74/489
[58] Field of Search ...................... 74/489, 502.2, 557, 74/578

[56] References Cited

U.S. PATENT DOCUMENTS

| | | | |
|---|---|---|---|
| 3,403,577 | 10/1968 | Ozaki | 74/480 |
| 3,546,960 | 12/1970 | Masuda | 74/489 |
| 3,974,712 | 8/1976 | Kaufman | 74/479 |
| 4,193,318 | 3/1980 | Golobay | 74/489 |
| 4,232,565 | 11/1980 | Leonheart | 74/502.2 |
| 4,267,746 | 5/1981 | Pruett | 74/489 |
| 4,425,819 | 1/1984 | Shimano | 74/489 |
| 4,459,871 | 7/1984 | Shimano | 74/489 |
| 4,462,267 | 7/1984 | Shimano | 74/489 |
| 4,637,273 | 1/1987 | Nagano | 74/502.2 |
| 4,679,460 | 7/1987 | Yoshigai | 74/489 |
| 4,916,967 | 4/1990 | Nakamura | 74/489 X |
| 4,977,792 | 12/1990 | Nagano | 74/489 X |

FOREIGN PATENT DOCUMENTS

| | | | |
|---|---|---|---|
| 2481221 | 10/1981 | France | 74/502.2 |
| 2054106 | 2/1981 | United Kingdom | 74/502.2 |

Primary Examiner—Vinh T. Luong
Attorney, Agent, or Firm—William H. Eilberg

[57] ABSTRACT

A bicycle brake lever assembly comprises a mount bracket having a front end and a base end fixable to a bicycle handlebar, and a brake lever extending downward from the mount bracket and having a connecting end pivotally connected to the front end of the mount bracket. The mount bracket further has an upper surface elongated enough to work as a palm rest for a rider. The brake lever has a first finger engaging portion which is substantially straight and extends rearward from the connecting end to approach the base end of the mount bracket. The brake lever further has a second finger engaging portion which is substantially straight and bent relative to the first finger engaging portion to extend downward away from the mount bracket.

16 Claims, 5 Drawing Sheets

BICYCLE BRAKE LEVER ASSEMBLY

BACKGROUND OF THE INVENTION

1. Field of the Invention

This invention relates generally to bicycle brake lever assemblies. It relates more specifically to a bicycle brake lever assembly of the type which includes a mount bracket elongated enough to work as a palm rest for a rider.

2. Description of the Prior Art

As is well known, many of sports bicycles such as racing bicycles are provided with a drop type handlebar which includes an intermediate straight portion centrally connected to a handlebar stem by means of a handlebar lug, and a pair of U-shaped, downwardly bent side portions (drop portions) formed at both ends of the intermediate straight portion. In such a handlebar, a brake lever assembly is mounted to each drop portion to enable the rider to conduct a braking operation while he (or she) grips the drop portion in a high speed running posture.

Generally, a brake lever assembly for such a sports bicycle comprises a mount bracket fixed to each handlebar drop portion to extend forward therefrom, and a brake lever pivotally connected to the mount bracket to extend downward therefrom. A brake control cable connected to a corresponding brake assembly is usually introduced from above into the mount bracket for connection to the brake lever, as disclosed for example in U.S. Pat. Nos. 3,403,577, 3,546,960, 3,974,712, 4,267,746, 4,679,460. Alternatively, the control cable may be guided from behind into the mount bracket, as disclosed for example in U.S. Pat. Nos. 4,425,819 or 4,459,871.

In running, the rider tries to assume an optimum riding posture depending on various purposes and road conditions. For example, when running at a high speed on a flat road or downhill, the rider normally grips the drop portions of the handlebar, thereby assuming a forwardly inclined riding posture. On the other hand, a more relaxing riding posture is required when running at a low speed on an uphill for example. One good gripping position for such running is the mount bracket of the brake lever assembly because the rider's hand can still be held close to the brake lever for braking.

For this purpose, the mount bracket of the brake lever assembly is often made to have an elongated upper surface, preferably in the shape of a saddle, for working as a palm rest. Further, the mount bracket may be formed at a front end portion thereof with an integral hand stopper which projects upward from the palm resting upper surface for preventing the rider's hand from forwardly slipping off the mount bracket due to an inertial force produced when braking.

In general, a typical brake lever assembly to be mounted to the drop type handlebar is designed to be most conveniently operated when the rider assumes the forwardly inclined posture by gripping each drop portion of the handlebar. In fact, such a design is preferred because the forwardly inclined posture is usually taken when running at a high speed, so that most effective braking is required for this running posture. Thus, the brake lever of the typical brake lever assembly is made to extend downward away from the mount bracket generally along the curvature of the handlebar drop portion.

However, the typical design for the brake lever assembly is disadvantageous for conducting a braking operation while gripping the mount bracket. Specifically, the brake lever extends downward away from the mount bracket, so that the rider's fingers, when extended in a natural fashion with the palm resting on the upper surface of the mount bracket, become substantially parallel to the brake lever. Such a finger orientation is very inconvenient for operating the brake lever. Therefore, selected fingers (usually the forefinger and middle finger) of the rider must be unnaturally oriented to engage the brake lever the pivotal point thereof and pull it rearwardly toward the handlebar drop portion. Obviously, combined with a small lever ratio, such an unnatural operation will not result in a sufficient braking force.

Further, while resting or gripping on the mount bracket, the rider must pull the brake lever toward the handlebar drop portion. Such a braking operation generates a reaction force which causes the rider's hand to slip forward on the palm resting upper surface of the mount bracket. Though the hand stopper provided at the front end of the mount bracket is effective for preventing the rider's hand from forwardly slipping off the mount bracket, the operational reaction force at least gives the rider an anxiety of complete slip-off. This anxiety becomes more realistic due to the fact that a forward inertial force is produced at the time of braking.

A similar problem also occurs when the brake lever assembly is mounted to a bull-horn type handlebar which is increasingly used for racing bicycles. This type of handlebar comprises a substantially horizontal intermediate portion, and a pair of curved side portions (bull horns) which extend forwardly upward from both ends of the intermediate portions like bull horns. The brake lever assembly, which is substantially identical in arrangement to the one for a drop type handlebar, is mounted to each horn tip of the bull-horn handlebar.

SUMMARY OF THE INVENTION

It is, therefore, an object of the invention to provide a bicycle brake lever assembly which can be conveniently operated for braking when the rider assumes either of two different running postures.

Another object of the present invention is to provide a bicycle brake lever assembly which enables the rider's palm to be more firmly pressed against the mount bracket when used for braking while gripping the mount bracket, thereby reducing the likelihood of the rider's hand slipping off the mount bracket in such a braking mode.

According to the invention, there is provided a bicycle brake lever assembly comprising: a mount bracket having a front end and a base end fixable to a bicycle handlebar, the mount bracket further having an upper surface elongated enough to work as a palm rest for a rider; and a brake lever extending downward from the mount bracket and having a connecting end pivotally connected to the front end of the mount bracket; wherein the brake lever has a first finger engaging portion which is substantially straight and extends rearward from the connecting end to approach the base end of the mount bracket; and the brake lever further has a second finger engaging portion which is substantially straight and bent relative to the first finger engaging portion to extend downward away from the mount bracket.

Other objects, features and advantages of the present invention will be fully understood from the following detailed description given with reference to the accompanying drawings.

BRIEF DESCRIPTION OF THE DRAWINGS

In the accompanying drawings:

FIG. 1' is a view similar to FIG. 1 but showing dimensional relation between various portions of the brake lever assembly;

DESCRIPTION OF THE PREFERRED EMBODIMENTS

Figure 1:
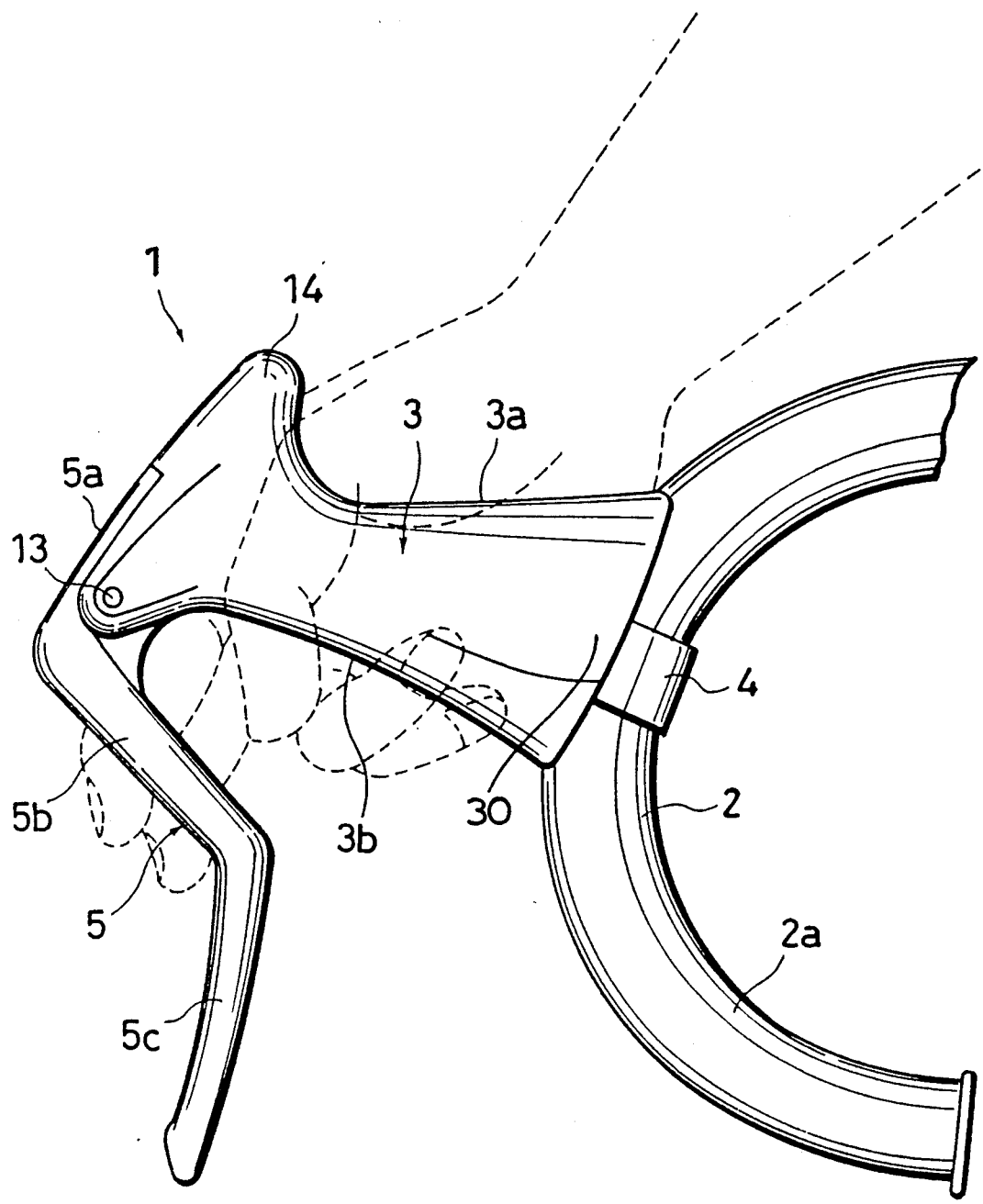
FIG. 1 is a side view showing a brake lever assembly according to an embodiment of the present invention as mounted to a drop type handlebar.
Figure 1:
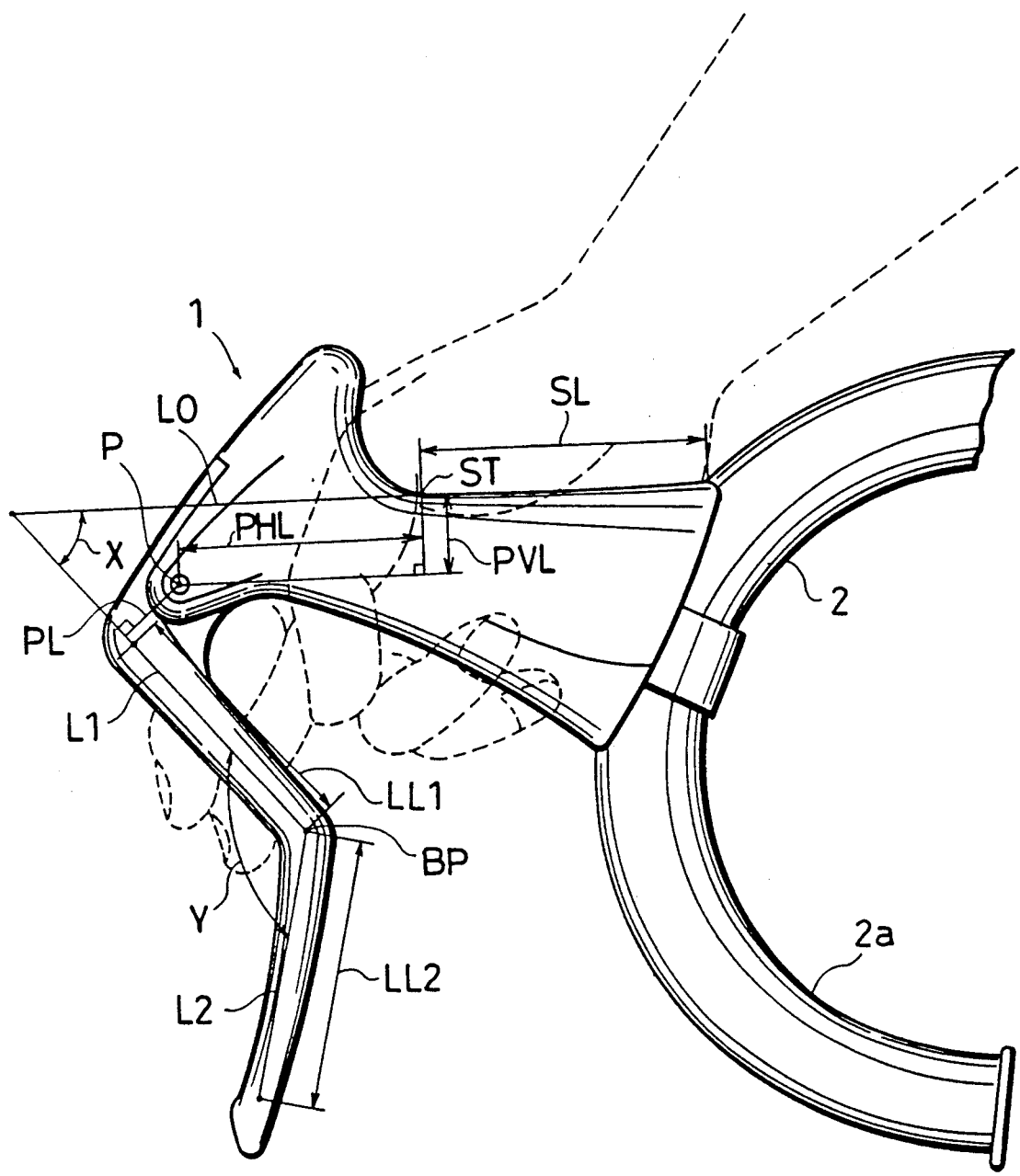

Referring now to FIG. 1 of the accompanying drawings, there is illustrated a right-hand drop portion 2 of a drop type handlebar which is fitted with a right-hand brake lever assembly 1 embodying the invention. The handlebar includes a left-hand drop portion (not shown) which is also fitted with a similar left-hand brake lever assembly (not shown) in symmetry with the illustrated right-hand brake lever assembly.

The illustrated brake lever assembly 1 comprises a hollow mount bracket 3 fixed via a mounting band 4 (see also FIG. 2) to the corresponding drop portion 2 of the handlebar to project forwardly therefrom, and a brake lever 5 pivotally connected at one end (upper end) 5a to the front end of the mount bracket 3 to extend generally downward therefrom. The mount bracket has an upper surface 3a workable as a palm rest, and a lower surface 3b which may be suitably shaped to facilitate gripping.

Figure 2:
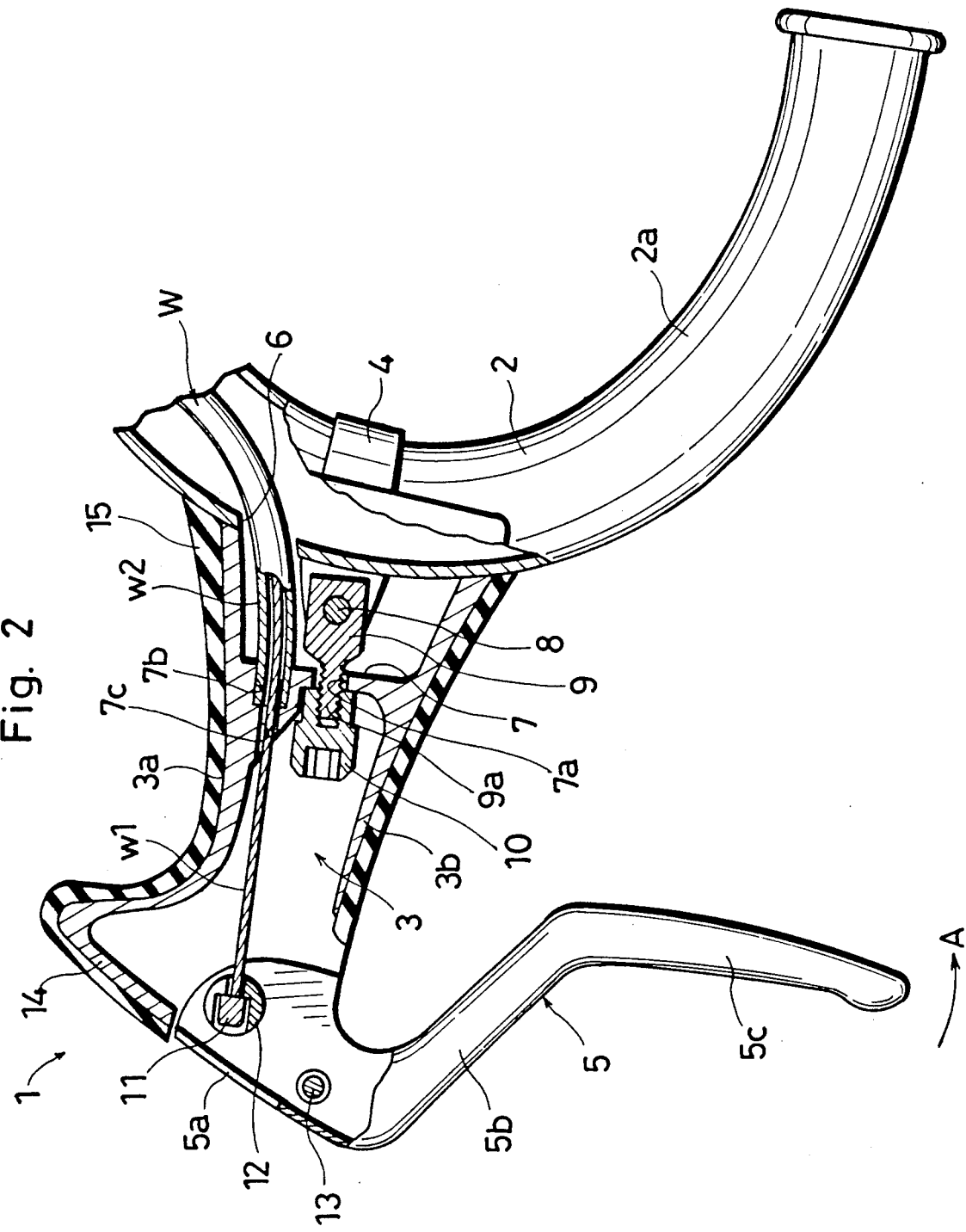
FIG. 2 is also a view similar to FIG. 1 but showing the brake lever assembly in section.

As illustrated in FIG. 2, a double type control cable W, which connects the brake lever assembly 1 to a corresponding brake assembly (not shown), includes an inner cable w1, and an outer cable w2 enclosing the inner cable. The control cable W is guided within the handlebar drop portion 2, and taken through a hole 6 formed at a lever mounting position of the handlebar drop portion 2 to enter into the mount bracket 3.

The hollow mount bracket 3 is internally provided with an intermediate partition wall 7. The mounting band 4 is substantially circular and has a pair of ends connected to each other by a bridging pin 8. An engaging member 9 is supported on the bridging pin 8 and has a projecting threaded portion 9a which passes through a hole 7a formed in the partition wall 7. A lock nut 10 is screwed on the threaded portion 9a into abutment with the partition wall 7, so that the mount bracket 3 is fixed to the handlebar drop portion 2 upon tightening of the lock nut.

The partition wall 7 of the mount bracket 3 is further formed with a larger diameter bottomed bore 7b as well as with a smaller diameter bore 7c in communication with the bottomed bore 7b. The outer cable w2 of the double type control cable W has one end anchored in the bottomed bore 7b, whereas the inner cable w1 extends through the smaller diameter bore 7c. One end of the inner cable w1 provided with an enlarged head 11 which is arrested by a catch 12 rotatably mounted on the upper end 5a of the brake lever 5. Indicated at 13 is a pin which is used to pivotally connect the brake lever 5 to the front end of the mount bracket 3.

When the brake lever 5 is pivoted in the direction of an arrow A in FIG. 2, the inner cable w1 engaging the lever is pulled relative to the outer cable w2 engaging the fixed mount bracket 3. As a result, the unillustrated brake assembly is actuated for braking in a known manner.

Figure 5:
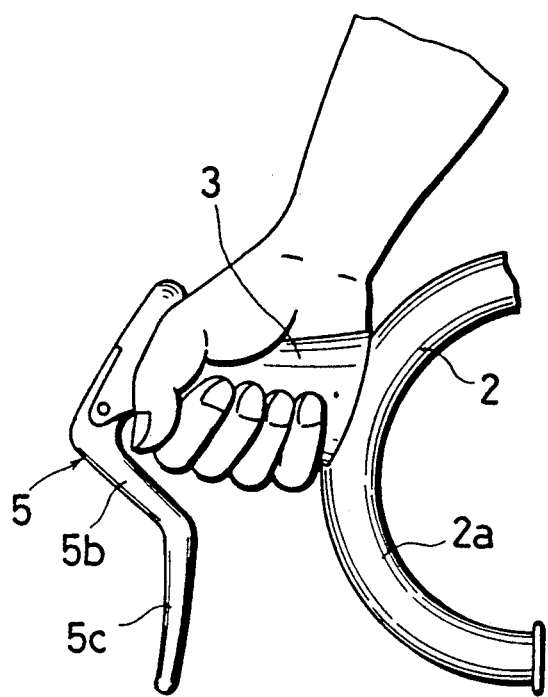

According to the embodiment illustrated in FIGS. 1 and 2, the mount bracket 3 is extended sufficiently forward so that a rider's palm can be rested on the upper surface 3a of the mount bracket. The length of the bracket lower surface 3b and the spacing thereof from the bracket upper surface 3a are such that the rider's fingers can engage the bracket lower surface from below. Thus, the rider can fully and stably grip the mount bracket 3, as shown in FIG. 5.

Preferably, the upper surface 3a of the mount bracket 3 is formed like a saddle to provide a stable support for the rider's palm. Further, the mount bracket 3 has a front end integrally formed with a hand stopper 14 which projects upward from the bracket upper surface 3a to prevent the rider's hand from slipping forward. Advantageously, the mount bracket 3 is entirely covered by a rubber or resin coating 15 to prevent hand slippage and to protect the mount bracket.

According to the present invention, the brake lever 5, which is pivotally connected at its upper end 5a to the front end of the mount bracket 3, further has a first finger engaging portion 5b and a second finger engaging portion 5c. The first finger engaging portion 5b is generally straight, and extends downwardly rearward from the lever upper end 5a to approach the base end 30 of the mount bracket 3 (the handlebar drop portion 2). The second finger engaging portion 5c is also generally straight, but abruptly bent relative to the first finger engaging portion to extend downward therefrom away from the mount bracket 3.

Figure 3:
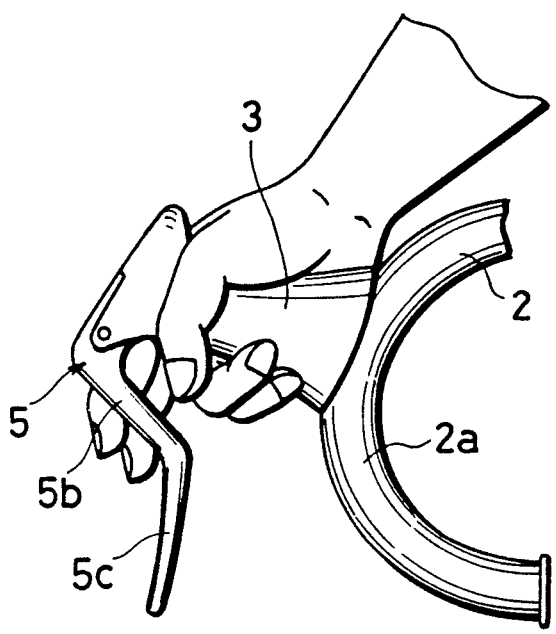
FIGS. 3 through 5 are views showing how the brake assembly of the present invention is used.
Figure 4:
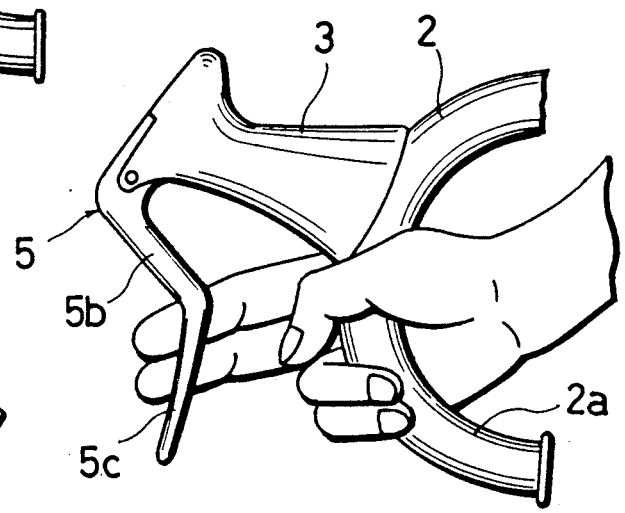

With the brake lever assembly 1 mounted to the handlebar, the rider can assume two riding postures. Specifically, in a first riding posture (forwardly inclined riding posture), the rider grips the handlebar drop portion 2 at its grip end 2a to obtain a maximum running speed, as shown in FIG. 4. In a second riding posture (half forwardly inclined riding posture), the rider grips the mount bracket 3 of the brake lever assembly 1 to obtain a relatively relaxing running condition, as shown in FIGS. 1, 3 and 5. It is further possible to assume a third riding posture (upright riding posture) wherein the rider grips the intermediate straight portion (not shown) of the handlebar to obtain a most relaxing running condition though such a riding posture has nothing to do with the brake lever assembly of the present invention.

The first finger engaging portion 5b of the brake lever 5 is straight, and extends rearwardly toward the base end 30 of the mount bracket 3. Thus, when assuming the second riding posture, selected fingers (normally forefinger and middle finger) of the rider can conveniently reach and engage the first finger engaging portion while gripping the mount bracket, as shown FIGS. 1 and 3. As a result, the rider can pivotally pull the brake lever in a natural grasping manner. In this way, the gripping force of the rider can be effectively utilized to operate the brake lever, thereby reliably braking the bicycle in this riding posture.

Further, when the first finger engaging portion 5b of the brake lever 5 is pivotally pulled up in the second riding posture, a reaction force is generated which tends to downwardly press the rider's palm against the upper surface 3a of the mount bracket 3. Therefore, the rider can still enjoy a stable grip relative to the mount bracket 3 even when performing a braking operation in the second riding posture. This advantage is particularly significant in view of the fact that braking of the bicycle is accompanied by an inertial force which may cause the rider's palm to slip forward over the hand stopper 14 unless the mount bracket is firmly gripped, giving the rider an anxiety when braking in the second riding posture.

On the other hand, the second straight finger engaging portion 5c of the brake lever 5 extends downward (generally vertically) from the first finger engaging portion 5b, and is positioned in front of the grip end 2a of the handlebar. Therefore, when assuming the first riding posture, selected fingers of the rider can conveniently reach and engage the second finger engaging portion to operate the brake lever in a conventional manner.

Obviously, the brake lever assembly 1 should preferably meet certain dimensional requirements in order to function as intended. These dimensional requirements are now described with reference to FIG. 1'.

In FIG. 1', a point ST represents the terminal position of the straight portion of the mount upper surface 3a (see FIG. 1), whereas a point P designates the center of the pin 13. A point BP is the bent point between the first and second finger engaging portions 5b, 5c of the brake lever 5. A line LO is an extension of the straight portion of the mount upper surface 3a. A line L1 is a longitudinal axis line of the first finger engaging portion 5b, while a line L2 is a longitudinal axis line of the second finger engaging portion 5c. These points and lines are used as reference points and lines, as follows.

The straight length SL of the mount upper surface 3a is a distance between the base end of the mount bracket 3 and the terminal position ST. The pin position P is determined by PVL which is the distance of the pin position from the straight terminal position ST in a direction perpendicular to the bracket straight surface line LO, as well as by PHL which is the distance of the pin position from the straight terminal position ST in a direction parallel to the bracket surface line LO. The orientation of the first finger engaging portion is given by the angle X between the first longitudinal axis L1 and the bracket straight surface line LO, whereas the position of the first finger engaging portion may be determined by the perpendicular distance PL of the pin position P from the first longitudinal axis L1. The orientation of the second finger engaging portion is determined by the angle Y between the first longitudinal axis L1 and the second longitudinal axis L2. Finally, the straight length of the first finger engaging portion is represented by LL1, while that of the second finger engaging portion is represented by LL2. The following numerical ranges are recommended for these parameters.

SL: 30–45 mm
PVL: 5–20 mm
PHL: 0–50 mm
X: 40–85°
Y: 105–165°
PL: 5–25 mm
LL1: 25–35 mm
LL2: 40–50 mm

Figure 6:
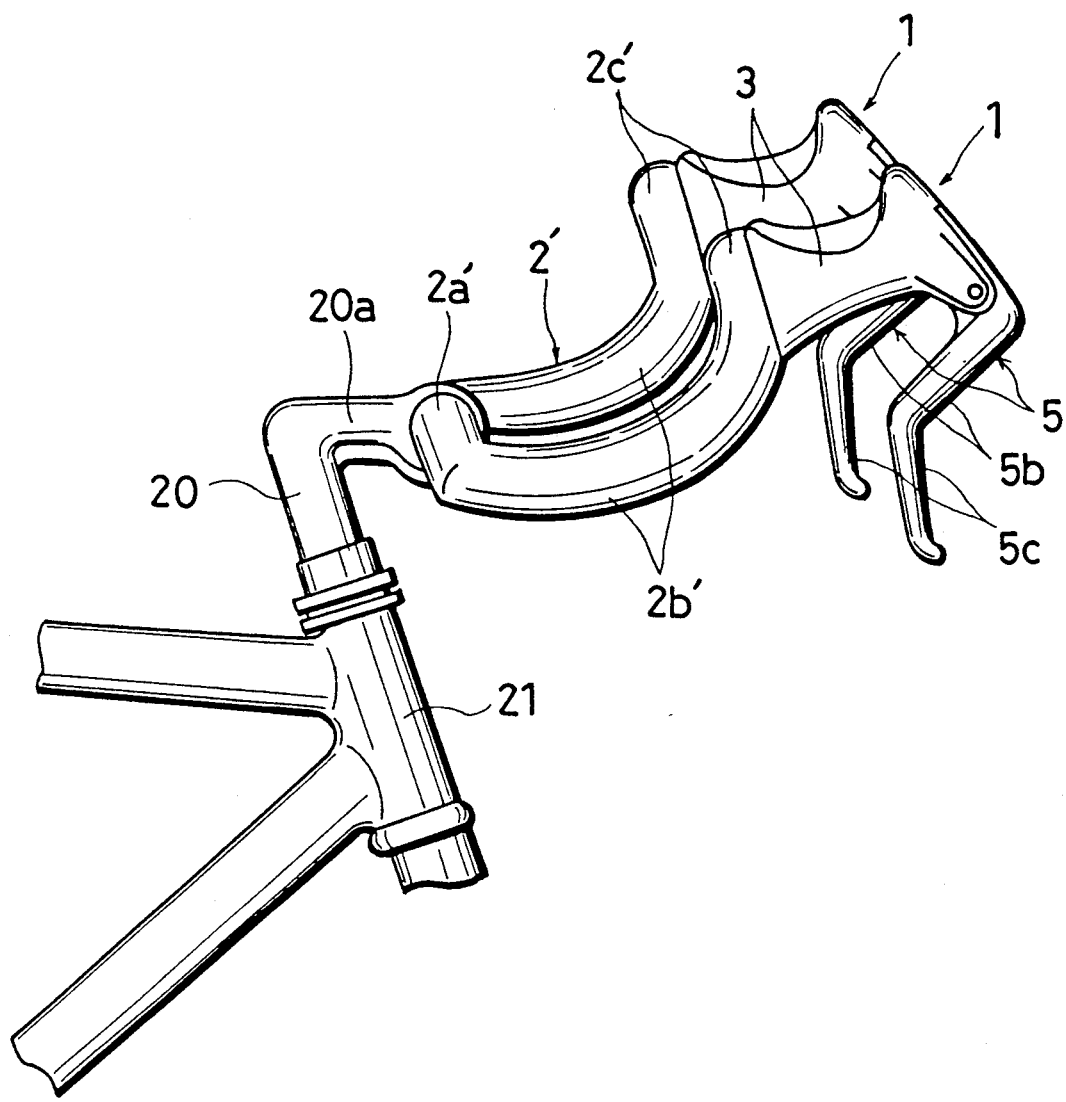
FIG. 6 is a perspective view showing the brake lever assembly of the present invention as mounted to a bullhorn type handlebar.

FIG. 6 shows a pair of brake lever assemblies 1 as mounted to a bull-horn type handlebar 2'. This handlebar is mounted to a handlebar stem 20 which in turn is mounted to the head tube 21 of the bicycle frame. The handlebar includes an intermediate portion 2a' centrally fixed to the handlebar stem 20 by means of a handlebar lug 20a, and a pair of curved horns 2b' extending forwardly upward from both ends of the intermediate portion.

Each brake lever assembly 1 is mounted to a corresponding horn tip 2c' of the handlebar 1. The brake lever assembly shown in FIG. 6 is substantially identical in structure to the one shown in FIGS. 1 to 5, so that the description of such a structure is not repeated.

Obviously, the rider uses the first finger engaging portion 5b of the brake lever 5 for braking when gripping the mount bracket 3. On the other hand, the rider utilizes the second finger engaging portion 5c for braking when gripping the handlebar horn 2b'.

The invention being thus described, it is obvious that the same may be varied in many ways. For instance, the first finger engaging portion 5b of the brake lever 5 may extend substantially parallel to the lower surface 3b of the mount bracket 3. Such variations are not to be regarded as a departure from the spirit and scope of the invention, and all such modifications as would be obvious to those skilled in the art are intended to be included within the scope of the following claims.

I claim:

1. A bicycle brake lever assembly for attachment to a handlebar of a bicycle, the assembly comprising: a mount bracket having a front end and a base end fixable to the handle bar, said mount bracket having a generally unobstructed upper surface shaped for generally mating engagement with a rider's palm and capable of acting as a palm rest, the upper surface of the mount bracket having a substantially straight portion which is integral with a hand stopper projecting upward from said upper surface at said front end of said mount bracket, the assembly further comprising a brake lever extending downward from said mount bracket and having a connecting end pivotally connected to said front end of said mount bracket; wherein said brake lever has a first finger engaging portion which is substantially straight and extends rearward from said connecting end to approach said base end of said mount bracket; and said brake lever further has a second finger engaging portion which is directly connected to said first finger engaging portion and which is substantially straight and abruptly bent relative to said first finger engaging portion to extend downward away from said mount bracket.

2. The brake lever assembly as defined in claim 1, wherein said second finger engaging portion is abruptly bent relative to said first finger engaging portion.

3. The brake lever assembly as defined in claim 1, wherein said straight portion of said upper surface of said mount bracket has a length of 30–45 mm.

4. The brake lever assembly as defined in claim 1, wherein said first finger engaging portion extends at an angle of 40–85° relative to said straight portion of said upper surface of said mount bracket.

5. The brake lever assembly as defined in claim 1, wherein said first finger engaging portion has a length of 25–35 mm.

6. The brake lever assembly as defined in claim 1, wherein said second finger engaging portion extends at an angle of 105-165° relative to said first finger engaging portion.

7. The brake lever assembly as defined in claim 1, wherein said second finger engaging portion has a length of 40-50 mm.

8. The brake lever assembly as defined in claim 1, wherein said mount bracket receives a brake control cable from said base end.

9. The brake lever assembly as defined in claim 1, wherein said mount bracket is covered with a slip preventive coating.

10. The assembly of claim 1, wherein said connecting end of said brake lever is pivotally connected to the front end of the mount bracket by a pin, the first finger engaging portion being located rearwardly from the pin.

11. The assembly of claim 1, wherein the mount bracket receives a brake control cable from the base end of the mount bracket.

12. In a bicycle, the bicycle having a handlebar and a brake control cable, the improvement comprising a mount bracket and a brake lever, the mount bracket having front end and a base end fixable to the handlebar, the mount bracket defining a channel for passage of the brake control cable therethrough, the mount bracket having a generally unobstructed upper surface shaped for generally mating engagement with a rider's palm and capable of cating as a palm rest, the upper surface of the mount bracket having a substantially straight portion which is integral with a handle stopper projecting upward from said supper surface at said front end of said mount bracket, the brake lever extending downward from said mount bracket and having a connecting end pivotally connected to said front end of said mount bracket, wherein said brake lever has a first finger engaging portion which is substantially straight and extends rearward from said connecting end to approach said base end of said mount bracket, wherein said brake lever further has a second finger engaging portion which is directly connected to said first finger engaging portion and which is substantially straight and abruptly bent relative to said first finger engaging portion to extend downward away from said mount bracket.

13. The improvement of claim 12, wherein said connecting end of said brake lever is pivotally connected to the front end of the mount bracket by a pin, the first finger engaging portion being located rearwardly from the pin.

14. In combination, a handlebar for a bicycle and a brake lever assembly, the brake lever assembly comprising a mount bracket having a front end and a base end fixed to the handlebar, the mount bracket having a generally unobstructed upper surface shaped for generally mating engagement with a rider's palm and capable of acting as a palm rest, the upper surface of the mount bracket having a substantially straight portion which is integral with a hand stopper projecting upward from said upper surface at said front end of said mount bracket, the assembly further comprising a brake lever extending downward from said mount bracket and having a connecting end pivotally connected to said front end of said mount bracket; wherein said brake lever has a first finger engaging portion which is substantially straight and extends rearward from said connecting end to approach said base end of said mount bracket; and said brake lever further has a second finger engaging portion which is directly connected to said first finger engaging portion and which is substantially straight and abruptly bent relative to said first finger engaging portion to extend downward away from said mount bracket.

15. The combination of claim 14, wherein said connecting end of said brake lever is pivotally connected to the front end of the mount bracket by a pin, the first finger engaging portion being located rearwardly from the pin.

16. The assembly of claim 14, wherein the mount bracket receives a brake control cable from the base end of the mount bracket.

* * * * *